(12) United States Patent
Park

(10) Patent No.: US 11,167,696 B2
(45) Date of Patent: Nov. 9, 2021

(54) CARGO SCREEN ASSEMBLY FOR VEHICLE

(71) Applicants: HYUNDAI MOTOR COMPANY, Seoul (KR); KIA MOTORS CORPORATION, Seoul (KR)

(72) Inventor: Soon-Sung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 84 days.

(21) Appl. No.: 16/700,206

(22) Filed: Dec. 2, 2019

(65) Prior Publication Data
US 2020/0189474 A1 Jun. 18, 2020

(30) Foreign Application Priority Data
Dec. 14, 2018 (KR) .......................... 10-2018-0162042

(51) Int. Cl.
*B60R 5/04* (2006.01)
(52) U.S. Cl.
CPC .................................... *B60R 5/047* (2013.01)
(58) Field of Classification Search
CPC ...................................................... B60R 5/047
USPC ....................................................... 296/37.16
See application file for complete search history.

(56) References Cited

U.S. PATENT DOCUMENTS

| 6,416,103 | B1* | 7/2002 | Laudenbach | B60R 5/047 160/290.1 |
| 6,568,732 | B2* | 5/2003 | De Gaillard | B60R 5/047 296/24.43 |
| 7,055,877 | B2* | 6/2006 | Sparrer | B60R 5/047 296/24.43 |
| 2001/0033084 | A1* | 10/2001 | Murray | B60J 1/2011 296/24.46 |
| 2014/0008933 | A1* | 1/2014 | Nagao | B60R 5/044 296/37.16 |

FOREIGN PATENT DOCUMENTS

KR 10-2013-0101195 A 9/2013

* cited by examiner

Primary Examiner — Joseph D. Pape
(74) Attorney, Agent, or Firm — Morgan, Lewis & Bockius LLP

(57) ABSTRACT

A cargo screen assembly for a vehicle includes: a screen unit disposed inside a trim of a vehicle in a wound state, and for covering a cargo loading space of the vehicle when being drawn toward a vehicle interior; a driving part for drawing out the screen unit from the trim and the front end of the screen unit from the trim; and a pulling-out part for supporting the screen unit drawn out from the trim.

18 Claims, 16 Drawing Sheets

CARGO SCREEN ASSEMBLY FOR VEHICLE

CROSS-REFERENCE TO RELATED APPLICATION

This application claims priority to Korean Patent Application No. 10-2018-0162042, filed on Dec. 14, 2018, which is incorporated herein by reference in its entirety.

TECHNICAL FIELD

The present disclosure relates to a cargo screen assembly for covering a space for loading cargo in a vehicle in which a space for occupying a passenger and the space for loading cargo are not separated from each other, and more particularly, to a cargo screen assembly for a vehicle, which does not require a separate space for storage by being received into a trim of the vehicle, and is restored to its original shape upon deployment.

BACKGROUND

Unlike a sedan type vehicle, in a vehicle such as a Sport Utility Vehicle (SUV), a space for occupying a passenger and a space for loading cargo are not separated from each other.

A cargo screen assembly is applied to such a vehicle so that the space for loading cargo is not exposed. The cargo screen assembly is used by winding a screen inside a housing, and then drawing out the screen if necessary.

However, there is a problem in that since the cargo screen assembly according to the related art has the housing exposed to the vehicle interior, the cargo screen assembly occupies a cargo loading space when not in use. If a large amount of cargo is loaded in the cargo loading space, it might not be possible to secure a space for storing the cargo screen assembly.

In addition, when the cargo screen assembly is not used, the user moves the position of the cargo screen assembly and stores the cargo screen assembly, and it is inconvenient to move the cargo screen assembly due to its weight, and it causes a reduction in fuel efficiency. Since a screen bar installed at the front end of the screen and for drawing out the screen and the housing for receiving the screen in a wound state are heavy, the cargo screen assembly has to be heavy.

In addition, there has been a problem in that the screen can be folded or wrinkled in the wound state, and wrinkled or folded marks are exposed as it is upon deploying the screen, thereby lowering the aesthetic quality.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to solve the above problems, and an object of the present disclosure is to provide a cargo screen assembly for a vehicle, which is installed inside a trim of a vehicle so that a housing for receiving a screen is not required, thereby not requiring a separate space.

Another object of the present disclosure is to provide a cargo screen assembly for a vehicle, which allows the screen to be restored to its original shape upon deploying the screen, thereby eliminating wrinkled or folded marks of the screen.

A cargo screen assembly for a vehicle according to an aspect of the present disclosure includes: a screen unit disposed inside a trim of the vehicle in a wound state, the screen unit covering a cargo loading space of the vehicle when being drawn toward a vehicle interior; a driving part for drawing out the screen unit from the trim and the front end of the screen unit from the trim; and a pulling-out part for supporting the screen unit drawn out from the trim.

The screen unit includes a screen composed of fabric, and a frame disposed on the circumference of the screen.

The cargo screen assembly for the vehicle further includes a wire having both ends connected to the frame along the drawn-out direction of the screen inside the frame.

The wire includes a plurality of wires spaced apart from each other in a direction perpendicular to the drawn-out direction of the screen.

The driving part includes a main switch disposed in the vehicle interior, and an actuator for rotating a main shaft around which the screen unit has been wound so that the front end of the screen unit is drawn out when the main switch is operated.

The end portion of the main shaft comprises an operating protrusion having a flat cross section. When the actuator operates, the operating protrusion rotates the main shaft so that the front end of the screen unit is drawn out from the trim.

The trim has a slit through which the screen unit is pushed-in and pulled-out.

The frame is composed of a material of a shape memory alloy, and connectors for supplying a current to the frame are provided on an upper portion and a lower portion of the slit when the screen unit is completely drawn out.

A current is supplied to the connectors when the main switch is operated.

The connectors are spaced apart from each other on the upper portion and the lower portion of the slit, respectively.

The connectors are disposed in a state of being elastically supported to rotate in a direction in which the connectors disposed on the upper portion and the lower portion of the slit, respectively, are connected to each other.

The connectors disposed on the upper portion and the lower portion of the slit, respectively, are electrically connected to each other and a current is supplied to the frame when the screen unit is maximally drawn out.

When the screen unit is wound around the main shaft, the front end of the screen unit is interposed between the connectors disposed on the upper portion and the lower portion of the slit, respectively, to separate the connectors disposed on the upper portion and the lower portion of the slit, respectively.

The screen is composed of fabric subject to the anti-wrinkle treatment.

The wire is composed of a shape memory alloy.

The pulling-out part includes a sub-shaft inside a trim facing the main shaft, a pulling-out strip wound around the sub-shaft, and for fixing the front end of the screen unit, a sub-switch disposed in the vehicle interior, and an actuator for rotating the sub-shaft so that the front end of the pulling-out strip is drawn out from the trim of the vehicle when the sub-switch is operated.

The pulling-out strip is coupled to the end portion of the screen unit by a coupling means when the screen unit is maximally drawn out.

The pulling-out part is disposed inside the trim facing the trim in which the screen unit is disposed in the vehicle interior.

The trim includes a slit in which the pulling-out strip is pushed-in and pulled-out.

According to the cargo screen assembly for the vehicle of the present disclosure having the above configuration, it is possible to receive the screen in the space inside the trim of the vehicle without requiring a separate space for storing the cargo screen, thereby improving the space utilization of the vehicle.

In addition, it is unnecessary to provide a heavy housing, a screen bar, etc. to reduce the weight, thereby solving the reduction in fuel efficiency caused by applying the cargo screen.

In addition, it is possible to eliminate wrinkled, folded marks, etc. of the screen by the shape memory material upon deployment, thereby improving the aesthetic quality and maximizing the covering amount when used.

DESCRIPTION OF SPECIFIC EMBODIMENTS

Figure 1:
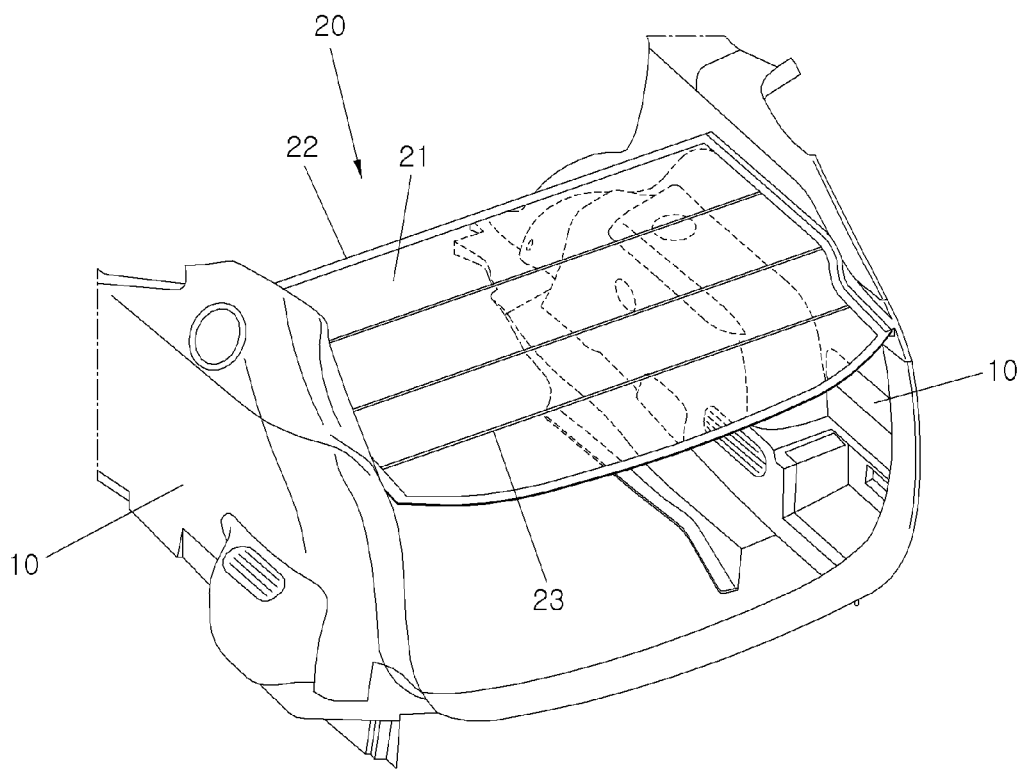
FIG. 1 is a perspective diagram illustrating the usage state of a cargo screen assembly for a vehicle according to an exemplary embodiment of the present disclosure.
Figure 2:
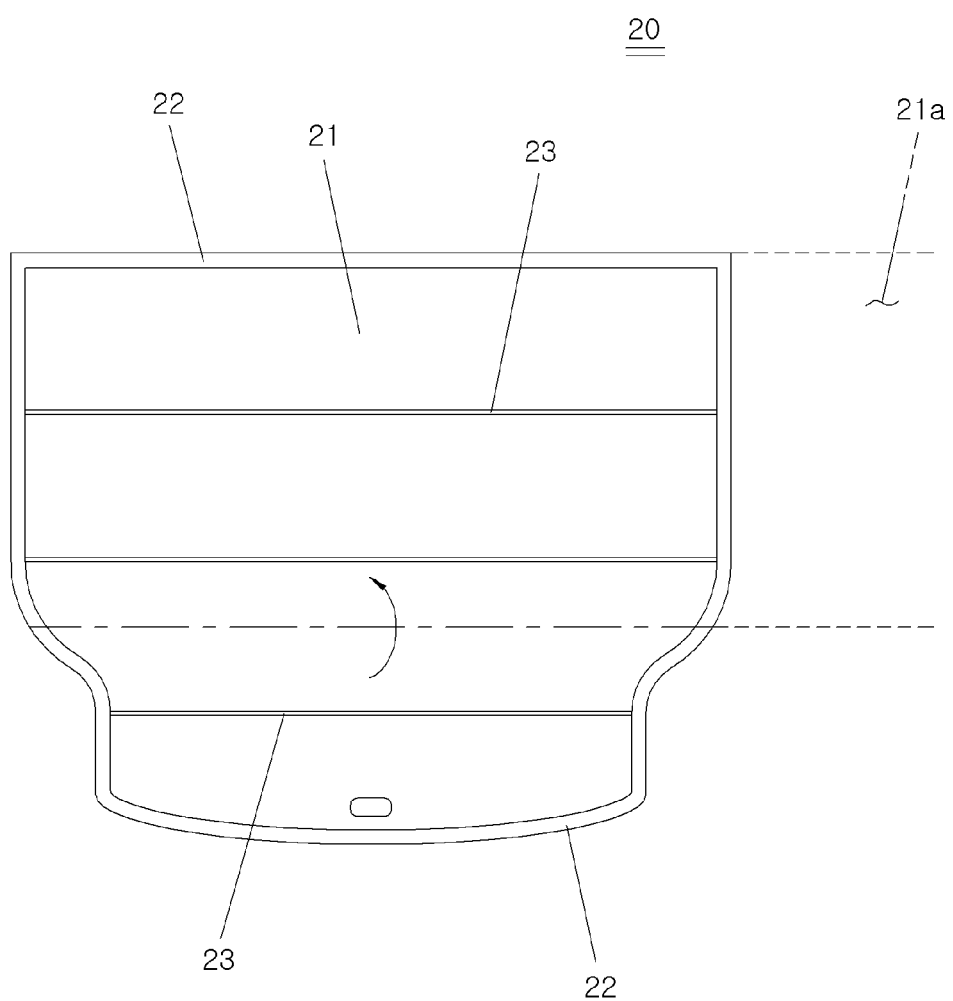
FIG. 2 is a plane diagram illustrating a screen unit in the cargo screen assembly for the vehicle according to an exemplary embodiment of the present disclosure.
Figure 3:
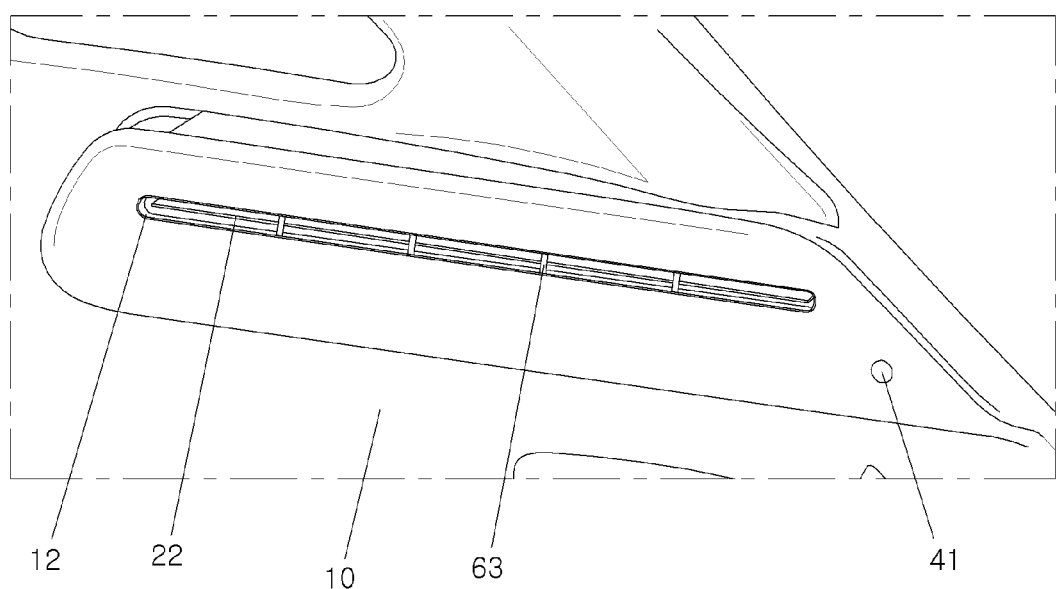
FIG. 3 is a perspective diagram illustrating, from the outside of the trim, the state where the cargo screen assembly for the vehicle according to an exemplary embodiment of the present disclosure has been installed in a trim of the vehicle.
Figure 4:
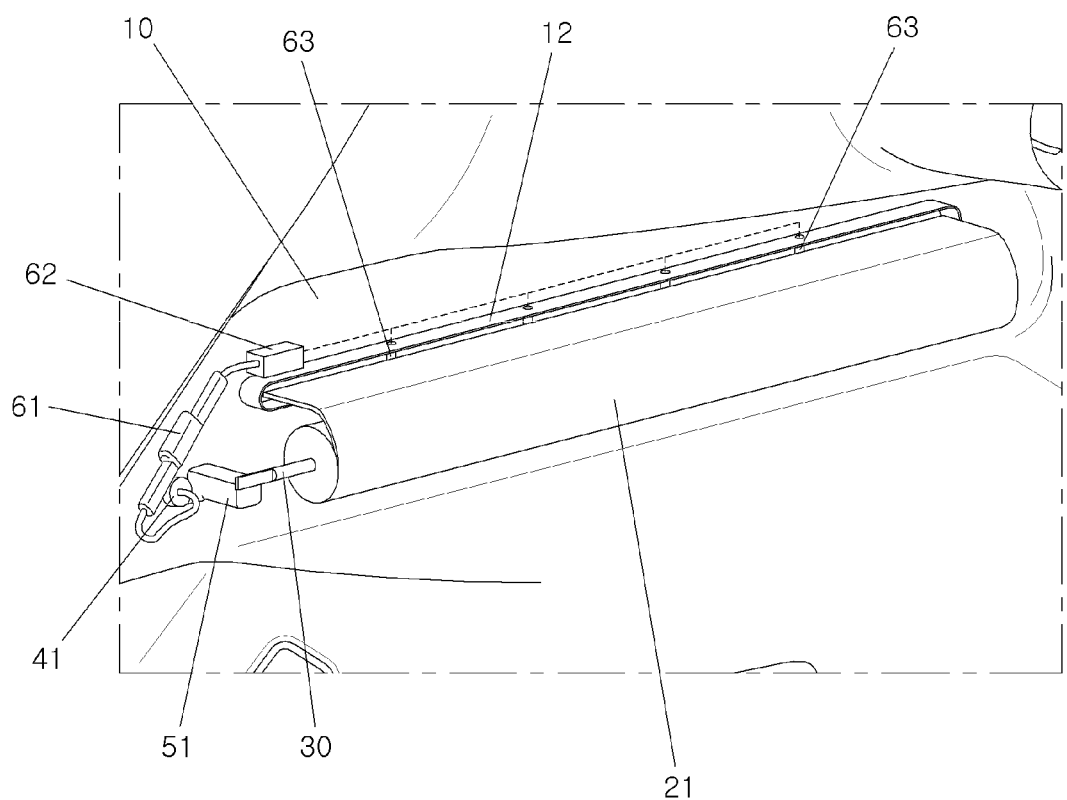
FIG. 4 is a perspective diagram illustrating, from the inside of the trim, the state where the cargo screen assembly for the vehicle according to an exemplary embodiment of the present disclosure has been installed in a trim of the vehicle.
Figure 5A:
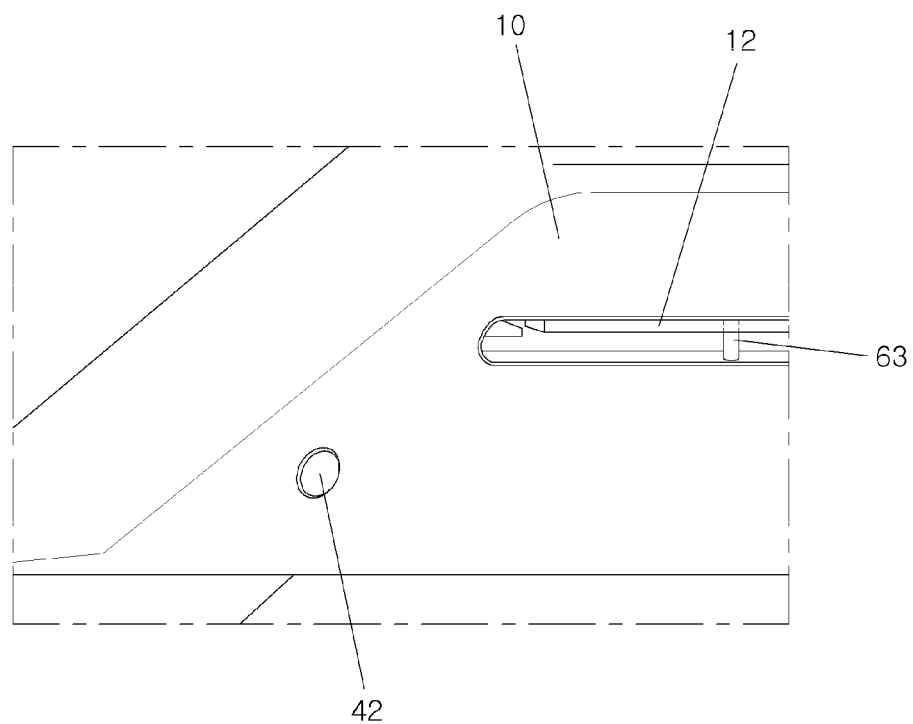
FIG. 5A is a perspective diagram illustrating, from the outside of the trim, the state where a connecting part has been installed in the trim of the vehicle in the cargo screen assembly for the vehicle according to an exemplary embodiment of the present disclosure.
Figure 5B:
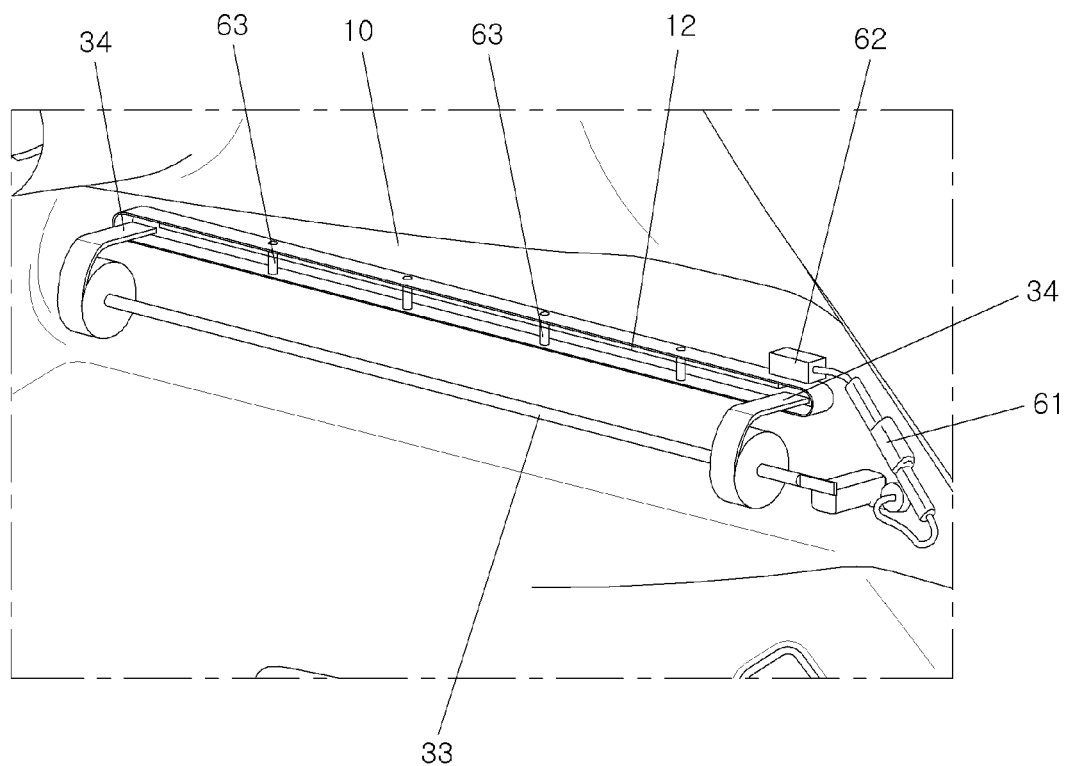
FIG. 5B is a perspective diagram illustrating, from the inside of the trim, the state where the connecting part has been installed in the trim of the vehicle in the cargo screen assembly for the vehicle according to an exemplary embodiment of the present disclosure.
Figure 5C:
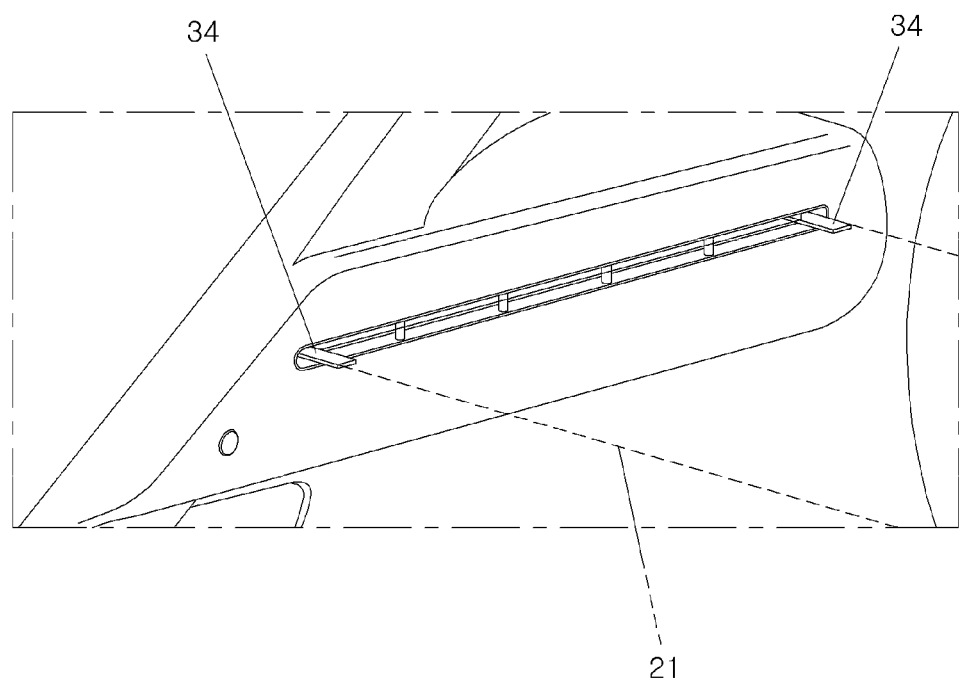
FIG. 5C is a perspective diagram illustrating the state where the connecting part has been drawn out in the cargo screen assembly for the vehicle according to an exemplary embodiment of the present disclosure.

Hereinafter, a cargo screen assembly for a vehicle according to the present disclosure will be described in detail with reference to the accompanying drawings.

A cargo screen assembly for a vehicle according to an exemplary embodiment of the present disclosure includes a screen unit 20 installed inside a trim 10 of the vehicle in a wound state, and for covering a cargo loading space of the vehicle when being drawn into the vehicle interior, a driving part for drawing out the screen unit 20 from the trim 10 and the front end of the screen unit 20 from the trim 10, and a pulling-out part for supporting the screen unit 20 drawn out from the trim 10.

The screen unit 20 is installed inside the trim 10 of the vehicle in a wound state. When the cargo is loaded in the cargo loading space of the vehicle and then it is covered, the screen unit 20 is drawn out from the trim and deployed on the upper portion of the cargo loading space.

The screen unit 20 is disposed inside the trim 10 when not used (when not covering the cargo loading space), such that the space occupied by the screen unit 20 in the vehicle interior is unnecessary, and a configuration such as a screen bar for supporting the screen unit 20 becomes unnecessary.

The screen unit 20 includes a screen 21 made of fabric, a frame 22 formed on the circumference of the screen 21 to maintain the basic shape of the screen unit 20, and a wire 23 formed along the drawn-out direction of the screen 21 inside the frame 22.

The screen 21 is made of fabric to be wound around the trim 10 of the vehicle. Since the screen 21 is fabric, it can easily be wound, and can easily be deployed by pulling the end portion thereof. The screen 21 may be fabric subject to the anti-wrinkle treatment in order not to be wrinkled when being deployed on the screen unit 20.

The frame 22 maintains the shape of the circumference of the screen unit 20 when the screen unit 20 is deployed in the cargo loading space. That is, the frame 22 is in contact with the inside of the cargo loading space when the screen unit 20 is deployed.

The wire 23 is provided inside the frame 22 to support the screen 21. Both ends of the wire 23 can be connected to the frame 22 to support the screen 21. The wire 23 may be provided in plural to be spaced apart from each other. For example, the wire 23 may be disposed in plural along the longitudinal direction of the vehicle.

The frame 22 and the wire 23 are made of a material of a shape memory alloy so that the screen unit 20 is restored from the wound state when the screen unit 20 is deployed. Since the screen unit 20 has been wound inside the trim 10, wrinkles can occur upon development. The frame 22 and the wire 23 are made of a material of a shape memory alloy restored to its original state when a current or heat is applied thereto, thereby eliminating wrinkles upon deployment. In addition, since the screen 21 is also subjected to the anti-wrinkle treatment, wrinkles are eliminated when a current is applied to the frame 22 and the wire 23.

A main shaft 30 for winding the screen unit 20 is provided inside the trim 10. Since the main shaft 30 is installed in a state of being elastically supported in a direction of winding the screen unit 20, the screen unit 20 is wound around the main shaft 30 when an external force is not operated, and when the user pulls the end portion of the screen unit 20, the screen unit 20 can be untied and deployed from the main shaft 30. Since such a configuration is a typical configuration, a detailed description thereof will be omitted.

The driving part includes a main switch 41 installed at one side of the vehicle interior, and an actuator 51 for rotating the main shaft 30 by a predetermined angle upon operation of the main switch 41 so that the end portion of the screen unit 20 is drawn out to the vehicle interior.

The main switch 41 is provided at one side of the vehicle interior and operated by the user.

When the main switch 41 is operated, the actuator 51 operates so that the front end of the screen unit 20 is drawn out to the vehicle interior. The actuator 51 can be provided in the form of a solenoid that is extended when power is applied thereto. An operating protrusion 31 formed to have a flat cross section is formed at the end portion of the main shaft 30, and when the actuator 51 operates, the operating protrusion 31 is pushed in an eccentric state. When the operating protrusion 31 is pushed by the actuator 51, the main shaft 30 rotates so that the front end of the screen unit 20 is partially drawn out to the vehicle interior from the inside of the trim 10.

At this time, the length of the screen unit 20 drawn out to the vehicle interior by the operation of the actuator 51 is sufficient in case of the length for the user to pull the screen unit 20.

The actuator 51 can also be applied with another structure capable of rotating the main shaft 30, for example, a link, etc.

A pulling-out part, which can maintain the state where the screen unit 20 has been deployed, is formed at the opposite side of the place where the main shaft 30 is installed in the vehicle, when the screen unit 20 has maximally been drawn out and deployed.

The pulling-out part includes a sub-shaft 33 installed inside the trim of the vehicle facing the place where the main shaft 30 is installed, a pulling-out strip 34 wound around the sub-shaft 33, and for fixing the front end of the screen unit 20, a sub-switch 42 installed in the vehicle interior, and an actuator for rotating the sub-shaft 33 so that the front end of the pulling-out strip 34 is drawn out from the trim 10 of the vehicle when the sub-switch 42 is operated.

The sub-shaft 33 is installed inside the trim of the vehicle facing the main shaft 30. The sub-shaft 33 has the operating protrusion 31 formed at the end portion thereof like the main shaft 30. In addition, the sub-shaft 33 is installed in a state of being elastically supported in a direction of winding the pulling-out strip 34 in the same manner as the main shaft 30 is installed in the state of being elastically supported to wind the screen unit 20.

The pulling-out strip 34 is installed in a state of being wound around the sub-shaft 33, and fixes the end portion of the screen unit 20 when the screen unit 20 has maximally been drawn out. Since the end portion of the pulling-out strip 34 and the end portion of the screen unit 20 are provided with a coupling means such as a hook and a Velcro tape, the end portion of the screen unit 20 and the end portion of the pulling-out strip 34 are coupled to each other. The screen unit 20 is wound around the main shaft 30 and the pulling-out strip 34 is wound around the sub-shaft 33 in the state where the screen unit 20 and the pulling-out part are installed on both sides of the vehicle interior, respectively, such that when the screen unit 20 and the pulling-out strip 34 are connected to each other in the drawn-out state, the screen unit 20 can maintain the deployed state, thereby covering the cargo loaded in the cargo loading space of the vehicle.

The sub-switch 42 is operated by the user when the end portion of the pulling-out strip 34 should be drawn out. When the sub-switch 42 is operated, the actuator is operated to rotate the sub-shaft 33. When the main switch 41 is operated, if it is configured to operate the actuator 51 so that the main shaft 30 and the sub-shaft 33 operate simultaneously, the sub-switch 42 can be omitted.

The actuator is configured in the same manner as the actuator 51 for driving the main shaft 30.

When the frame 22 and the wire 23 have been drawn out and deployed from the trim 10 of the screen unit 20, the present disclosure includes a configuration for restoring the frame 22 and the wire 23 to their original shapes. For example, a connector 63 for supplying a current is provided so that the frame 22 and the wire 23 are restored to their original shapes.

Figure 13:
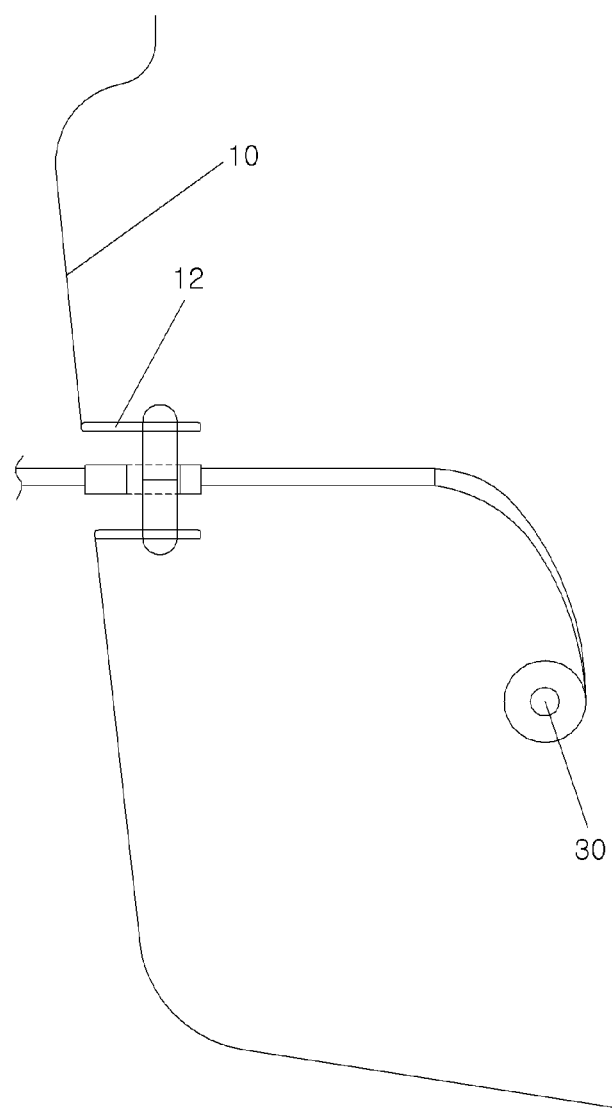
FIG. 13 is a cross-sectional diagram illustrating a major part in the initial deployed state of the screen unit in the cargo screen assembly for the vehicle according to an exemplary embodiment of the present disclosure.
Figure 14:
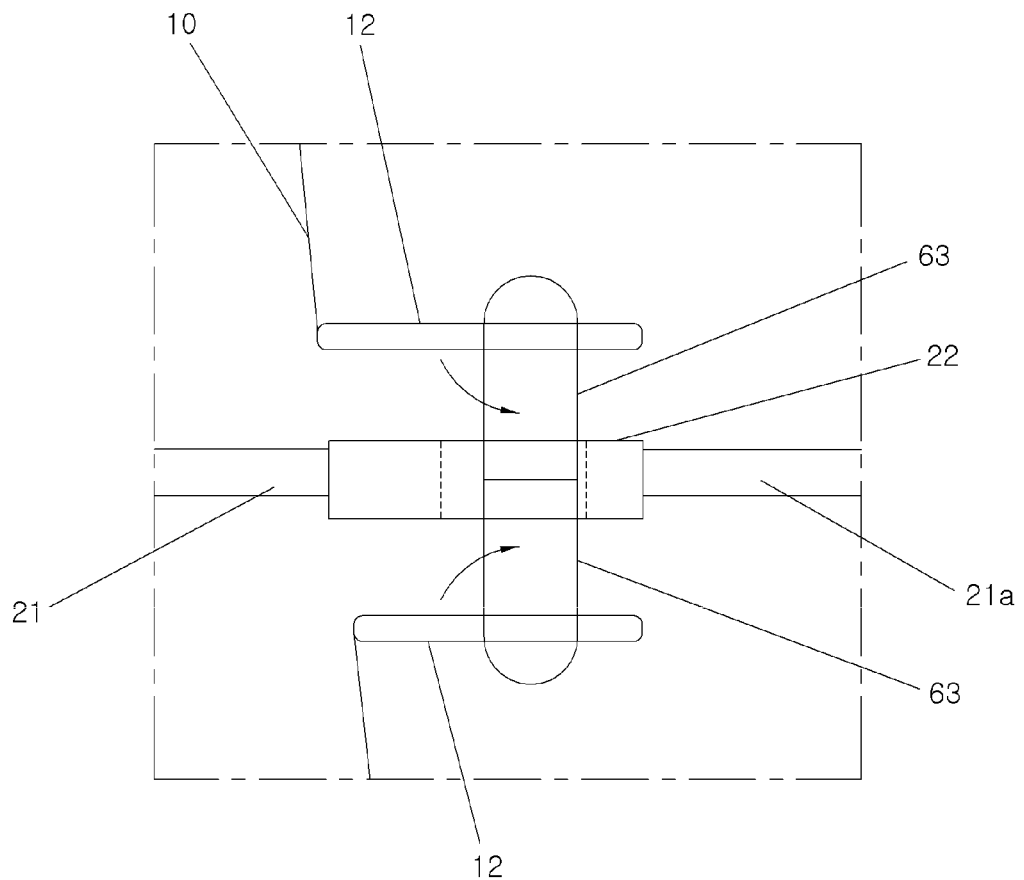
FIG. 14 is an enlarged diagram illustrating a major part of FIG. 13.

A slit 12 is formed in the trim 10 so that the screen unit 20 can be pushed-in and pulled-out, and the connectors 63 are provided on the upper portion and the lower portion of the slit 12, respectively. The connectors 63 are provided at the positions corresponding to the upper portion and the lower portion of the slit 12, respectively. The connectors 63 are installed in the slit 12 in a state of being elastically supported to rotate in a direction in which the connectors 63 installed on the upper portion and the lower portion of the slit 12, respectively, are connected to each other. That is, the connectors 63 are elastically supported always in order to become the state as illustrated in FIGS. 13 and 14. Therefore, when the screen unit 20 is drawn out, the connectors 63 rotate toward the vehicle interior, and when the screen unit 20 is maximally drawn out, the connectors 63 are installed in a state of being elastically supported to be restored to their original positions. In addition, when the screen unit 20 is wound, the connectors 63 rotate toward the inside of the trim. When the screen unit 20 is maximally drawn out, the connectors 63 installed on the upper portion and the lower portion of the slit 12 are connected to each other to be electrically conducted.

Figure 10:
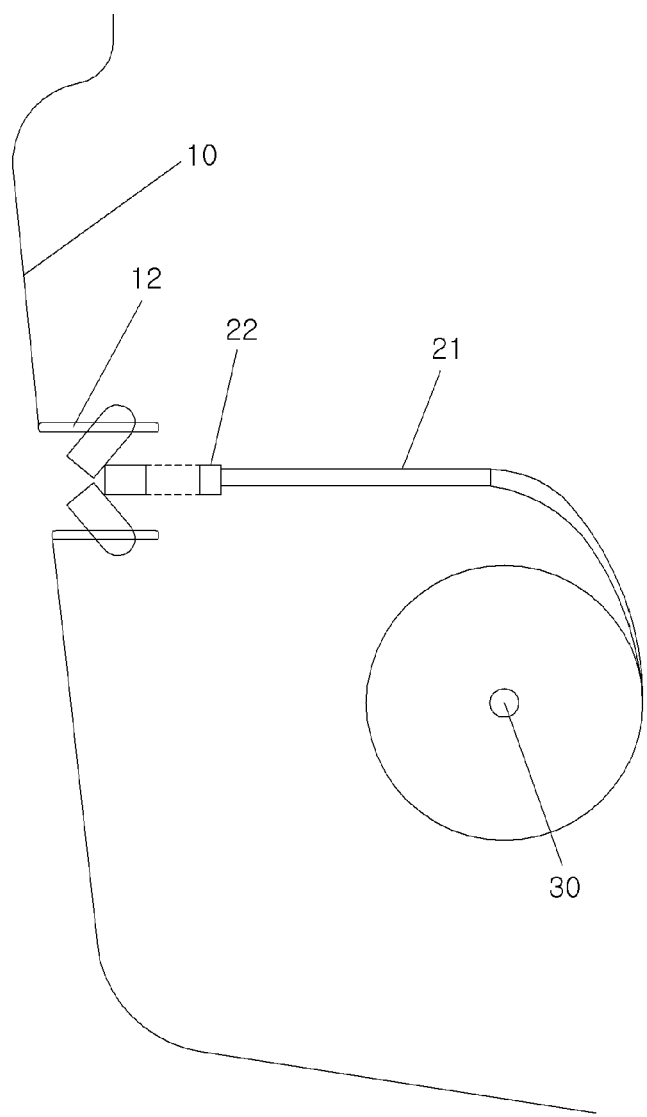
FIG. 10 is a cross-sectional diagram illustrating a major part in the state before the screen unit is deployed in the cargo screen assembly for the vehicle according to an exemplary embodiment of the present disclosure.
Figure 11:
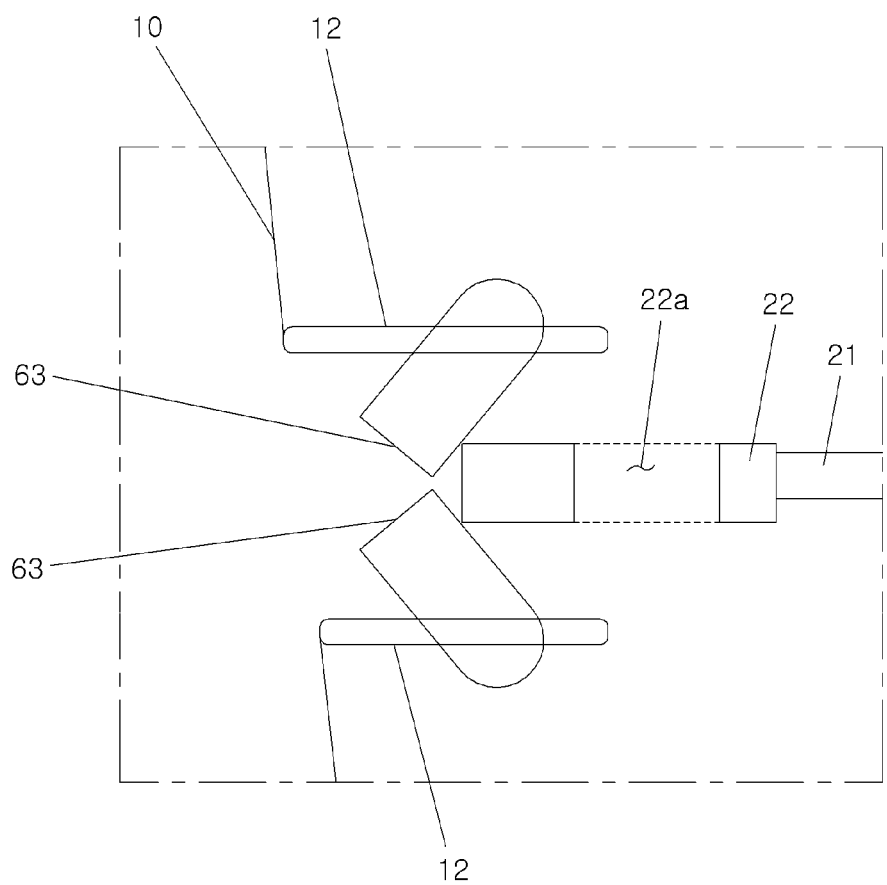
FIG. 11 is an enlarged diagram illustrating a major part of FIG. 10.
Figure 12:
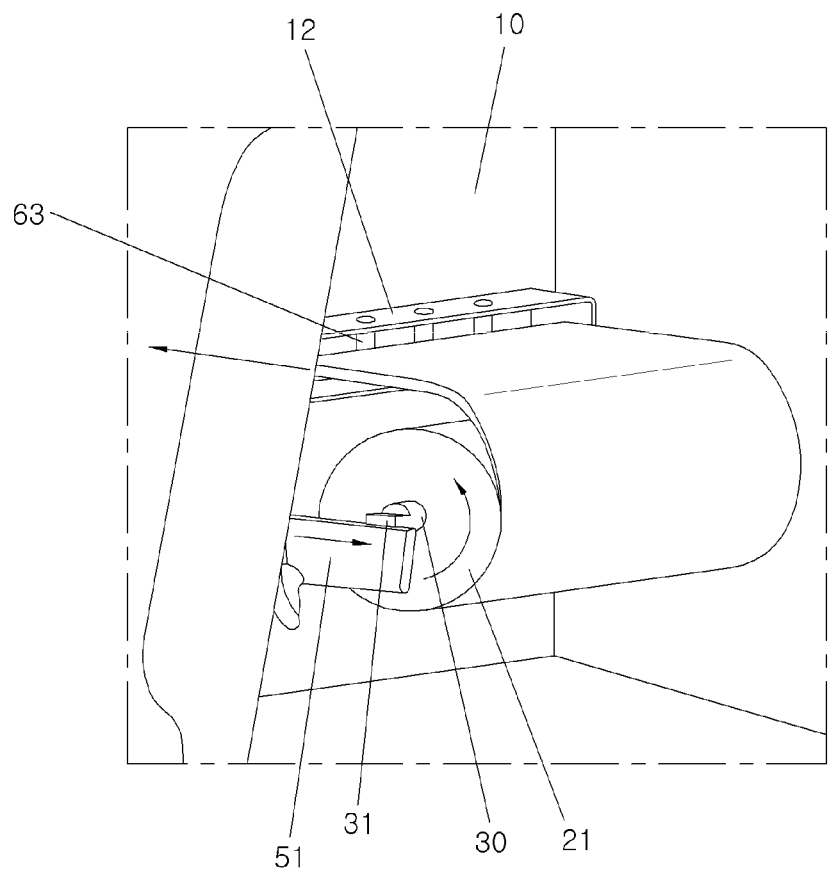
FIG. 12 is an enlarged perspective diagram illustrating, from the inside of the trim, a major part in the initial deployed state of the screen unit in the cargo screen assembly for the vehicle according to an exemplary embodiment of the present disclosure.

When the screen unit 20 is received into the trim 10, the front end of the screen unit 20 is interposed between the connectors 63 provided on the upper portion and the lower portion of the slit 12, respectively, so that the connectors 63 installed on the upper portion and the lower portion of the slit 12 are separated from each other (see FIGS. 10 and 11).

When the screen unit 20 is maximally drawn out, the connectors 63 installed on the upper portion and the lower portion of the slit 12 are restored to a seating part 22a formed on the frame 22 of the screen unit 20, and become in contact with each other, and when a current is applied thereto, they can be electrically conducted (see FIGS. 13 and 14). When power is applied to the connectors 63 in a state where the connectors 63 installed on the upper portion and the lower portion of the slit 12, respectively, have been connected to each other, a current is supplied to the frame 22 and the wire 23, such that the frame 22 and the wire 23 are restored to their original states. In FIG. 14, a reference numeral 21a denotes a part of the screen 21, and is a portion that is disposed inside the trim 10 and wound around the main shaft 30 even if the screen unit 20 is drawn out.

A rail configured so that the connectors 63 installed in plural to be spaced apart from each other on the upper portion of the slit 12 are electrically connected to each other can be provided on the upper portion of the slit 12. Likewise, a rail configured so that the connectors 63 installed in plural to be spaced apart from each other are electrically connected to each other can also be provided on the lower portion of the slit 12.

A current control part 61 for controlling whether to supply a current can be provided between the main switch 41 and the connector 63, and a connecting part 62 for controlling to supply a current to the current control part 61 and the rail can be provided.

An operation of the cargo screen assembly for the vehicle according to the present disclosure having the above configuration will be described as follows.

Figure 6:
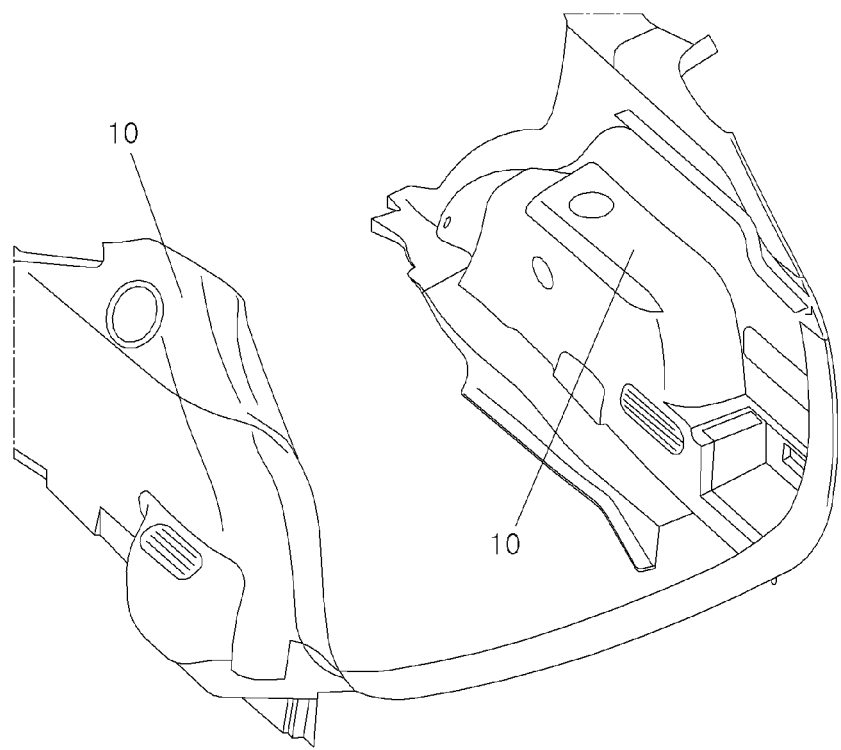
FIG. 6 is a perspective diagram illustrating the state before the screen unit is deployed in the cargo screen assembly for the vehicle according to an exemplary embodiment of the present disclosure.

In the state where the screen unit 20 has been wound inside the trim 10 of the vehicle (see FIG. 6), the cargo loading space of the vehicle may be exposed. Since the screen unit 20 does not cover the cargo loading space, the cargo can easily be loaded in the cargo loading space.

When it is desired to cover the cargo loading space, the screen unit 20 is exposed to cover the cargo loading space.

First, when the user operates the main switch 41, the actuator 51 operates to rotate the main shaft 30. When power is applied to the actuator 51, the actuator 51 is extended to push the operating protrusion 31 and thereby, the main shaft 30 is rotated.

When the main shaft 30 rotates, the front end of the screen unit 20 wound around the main shaft 30 is exposed to the vehicle interior through the slit 12.

The front end of the pulling-out strip 34 is exposed to maintain the state where the screen unit 20 has been deployed. When the user operates the sub-switch 42, the actuator installed at the pulling-out part operates so that the front end of the pulling-out strip 34 wound around the sub-shaft 33 is exposed to the vehicle interior.

When the actuator operates, as in the driving part, the actuator pushes the operating protrusion of the sub-shaft 33 to rotate the sub-shaft 33 when the sub-switch 42 is operated. When the sub-shaft 33 is rotated, the front end of the pulling-out strip 34 wound around the sub-shaft 33 is drawn out to the vehicle interior through the slit 12 of the trim 10.

Figure 7:
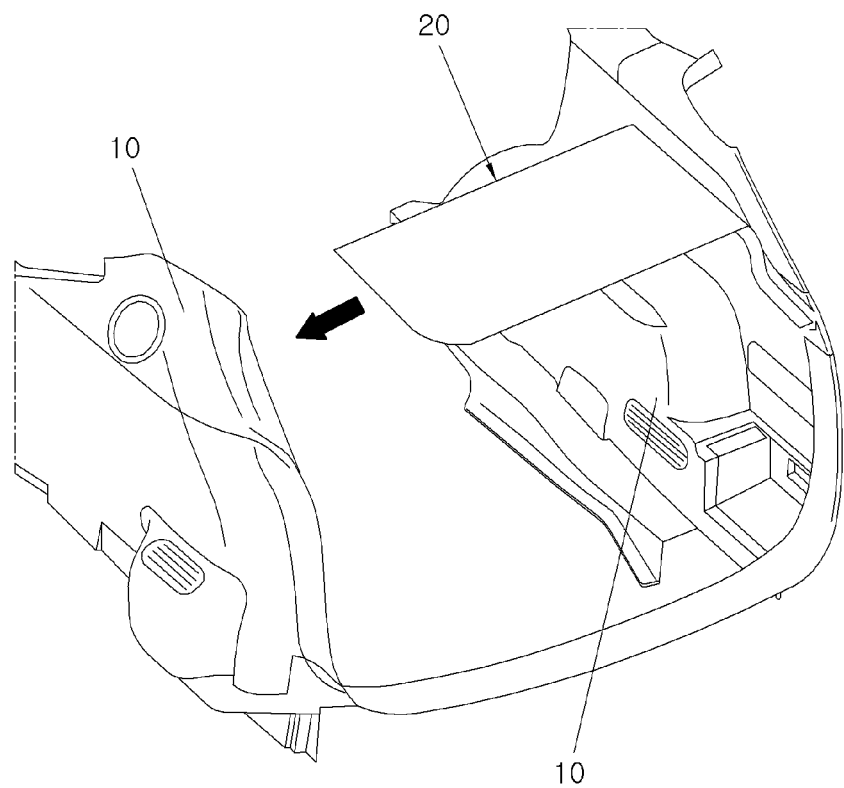
FIG. 7 is a perspective diagram illustrating the state while the screen unit is deployed in the cargo screen assembly for the vehicle according to an exemplary embodiment of the present disclosure.

When the front end of the screen unit 20 is exposed to the vehicle interior, the user pulls the front end of the screen unit 20 (see FIG. 7) to be likewise coupled to the front end of the pulling-out strip 34 exposed to the interior. When the screen unit 20 is coupled to the front end of the pulling-out strip 34, the screen unit 20 is deployed to cover the cargo loading space.

Figure 8:
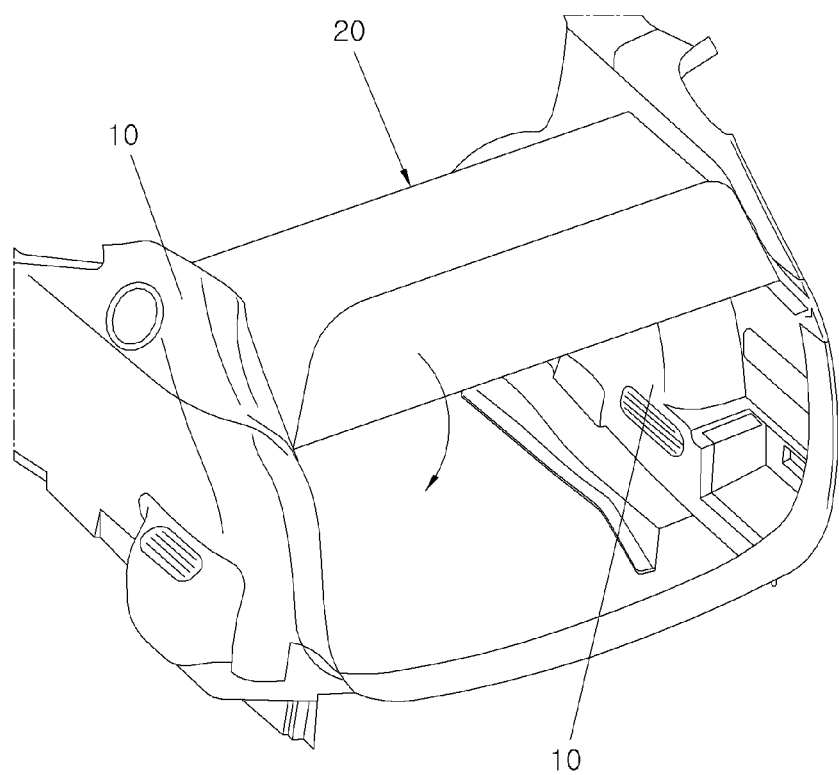
FIG. 8 is a perspective diagram illustrating the state where the screen unit is deployed, and then the folded portion is unfolded in the cargo screen assembly for the vehicle according to an exemplary embodiment of the present disclosure.
Figure 9:
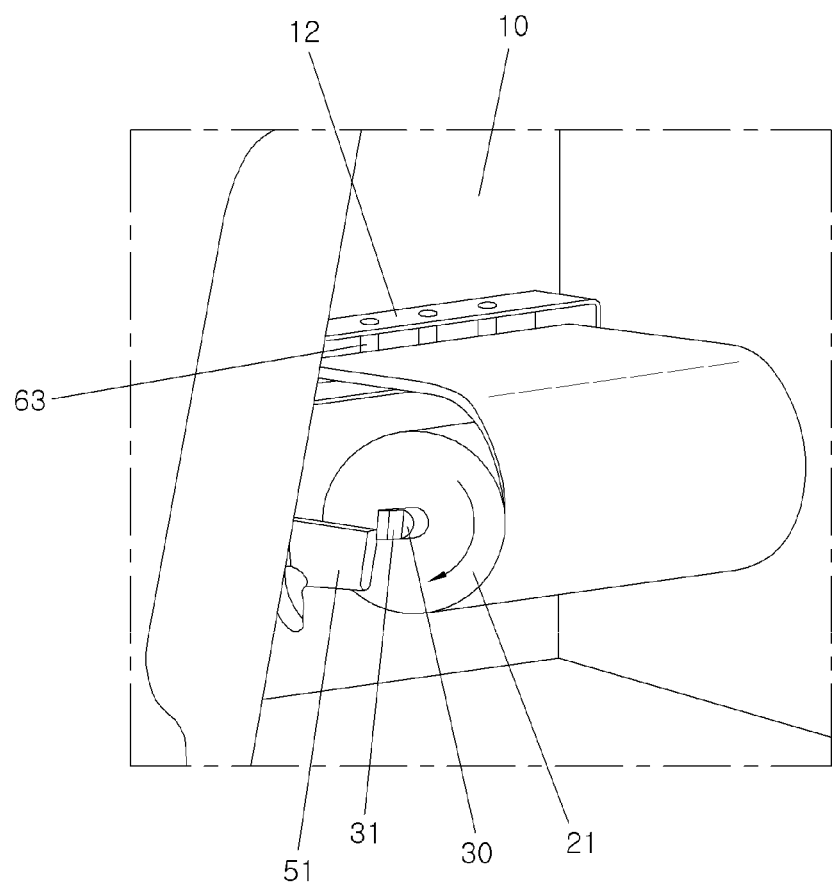
FIG. 9 is an enlarged perspective diagram illustrating, from the inside of the trim, a major part in the state before the screen unit is deployed in the cargo screen assembly for the vehicle according to an exemplary embodiment of the present disclosure.

As illustrated in FIG. 8, if a part of the screen unit 20 has been folded, it is unfolded so that the cargo loading space is covered by the screen unit 20.

When the user operates the main switch 41, power is applied to the frame 22 and the wire 23 so that the frame 22 and the wire 23 are restored to their original shapes.

When the screen unit 20 is fully deployed, the connectors 63 formed on the slit 12 are connected to each other, and power can be applied to the frame 22. The connectors 63 are in a state where the connectors 63 installed on the upper portion and the lower portion of the slit 12, respectively, have been separated from each other while the screen unit 20 is drawn out. However, when the screen unit 20 is completed to be drawn out, the connectors 63 are restored by an elastic force to the seating part 22a formed on the frame 22, and the connectors 63 installed on the upper portion and the lower portion of the slit 12, respectively, are connected to each other.

However, the fact that the connectors 63 installed on the upper portion and the lower portion of the slit 12, respectively, are only connected to each other is not electrically conducted, but when power is applied to the connectors 63 by the current control part 61 in the state where the connectors 63 installed on the upper portion and the lower portion of the slit 12, respectively, have been connected to each other, a current is supplied to the frame 22 and the wire 23.

When a current is supplied to the frame 22 and the wire 23, the frame 22 and the wire 23, which are made of a material of a shape memory alloy, are restored to their original shapes to be fully unfolded. As described above, when the frame 22 and the wire 23 are restored to their original shapes, the screen 21 also becomes taut to its original shape, such that the screen 21 is not wrinkled and becomes taut.

In order to load the cargo in the cargo loading space again, when the screen unit 20 is separated from the pulling-out strip 34, the screen unit 20 and the pulling-out strip 34 are wound around the inside of the trim 10 and are not exposed to the vehicle interior.

Since the main shaft 30 has been installed in the state of being elastically supported to wind the screen unit 20, the screen unit 20 is again wound around the main shaft 30 to be all received inside the trim 10 when the screen unit 20 and the pulling-out strip 34 are separated from each other.

At this time, all the connectors 63 have the state of being rotated toward the inside of the trim 10 by the screen unit 20 wound around the main shaft 30. When the screen unit 20 is maximally wound, the connectors 63 are connected to each other in the upright direction, but move by a small amount in a direction in which the screen unit 20 is drawn out by the spring back of a spring having wound the screen unit 20 to become the state as illustrated in FIGS. 10 and 11.

Likewise, the pulling-out strip 34 is also wound around the inside of the sub-shaft 33 again, and the pulling-out strip 34 is also received into the trim 10 again.

As described above, both the screen unit 20 and the pulling-out strip 34 are received into the trim 10, such that the screen unit 20 is not exposed to the vehicle interior.

According to the cargo screen assembly for the vehicle of the present disclosure having the above configuration, it is possible to receive the screen in the space inside the trim of the vehicle without requiring a separate space for storing the cargo screen, thereby improving the space utilization of the vehicle.

While exemplary embodiments have been shown and described above, it will be apparent to those skilled in the art that modifications and variations could be made without departing from the scope of the present invention as defined by the appended claim. For example, the abovementioned exemplary embodiments may be partially combined with each other.

What is claimed is:

1. A cargo screen assembly for a vehicle, the cargo screen assembly comprising:

a screen unit disposed inside a trim of the vehicle in a wound state, the screen unit covering a cargo loading space of the vehicle when being drawn toward a vehicle interior;

a driving part for drawing out the screen unit from the trim and a front end of the screen unit from the trim; and a pulling-out part for supporting the screen unit drawn out from the trim, wherein the trim has a slit through which the screen unit is pushed-in and pulled-out.

2. The cargo screen assembly for the vehicle of claim 1, wherein the screen unit comprises:

a screen composed of fabric; and a frame disposed on the circumference of the screen.

3. The cargo screen assembly for the vehicle of claim 2, further comprising a wire having both ends connected to the frame along a drawn-out direction of the screen inside the frame.

4. The cargo screen assembly for the vehicle of claim 3, wherein the wire includes a plurality of wires spaced apart from each other in a direction perpendicular to the drawn-out direction of the screen.

5. The cargo screen assembly for the vehicle of claim 4, wherein the driving part comprises:

a main switch disposed in the vehicle interior; and an actuator for rotating a main shaft around which the screen unit has been wound so that the front end of the screen unit is drawn out when the main switch is operated.

6. The cargo screen assembly for the vehicle of claim 5, wherein an end portion of the main shaft comprises an operating protrusion having a flat cross section, and wherein the operation protrusion is configured such that, when the actuator operates, the operating protrusion rotates the main shaft so that the front end of the screen unit is drawn out from the trim.

7. The cargo screen assembly for the vehicle of claim 1, wherein the frame is composed of a shape-memory alloy, and wherein connectors for supplying a current to the frame are disposed on an upper portion and a lower portion of the slit when the screen unit is completely drawn out.

8. The cargo screen assembly for the vehicle of claim 7, wherein a current is supplied to the connectors when the main switch is operated.

9. The cargo screen assembly for the vehicle of claim 7, wherein the connectors are spaced apart from each other on the upper portion and the lower portion of the slit, respectively.

10. The cargo screen assembly for the vehicle of claim 7, wherein the connectors are configured to elastically rotate in a direction in which the connectors disposed on the upper portion and the lower portion of the slit, respectively, are connected to each other.

11. The cargo screen assembly for the vehicle of claim 10, wherein the connectors disposed on the upper portion and the lower portion of the slit, respectively, are electrically connected to each other and a current is supplied to the frame when the screen unit is maximally drawn out.

12. The cargo screen assembly for the vehicle of claim 11, wherein, when the screen unit is wound around the main shaft, the front end of the screen unit is interposed between the connectors disposed on the upper portion and the lower portion of the slit, respectively, to separate the connectors disposed on the upper portion and the lower portion of the slit, respectively.

13. The cargo screen assembly for the vehicle of claim 7, wherein the screen is made of fabric subject to anti-wrinkle treatment.

14. The cargo screen assembly for the vehicle of claim 3, wherein the wire is made of a shape memory alloy.

15. The cargo screen assembly for the vehicle of claim 5, wherein the pulling-out part comprises:

a sub-shaft disposed inside a trim facing the main shaft;

a pulling-out strip wound around the sub-shaft, the pulling-out strip fixing to the front end of the screen unit;

a sub-switch disposed in the vehicle interior; and an actuator for rotating the sub-shaft so that a front end of the pulling-out strip is drawn out from the trim of the vehicle when the sub-switch is operated.

16. The cargo screen assembly for the vehicle of claim 15, wherein the pulling-out strip is coupled to an end portion of the screen unit when the screen unit is maximally drawn out.

17. The cargo screen assembly for the vehicle of claim 15, wherein the pulling-out part is disposed inside the trim facing the trim in which the screen unit is disposed in the vehicle interior.

18. The cargo screen assembly for the vehicle of claim 15, wherein the trim has the slit in which the pulling-out strip is pushed-in and pulled-out.

* * * * *